US010144649B2

United States Patent
Vandecandelaere et al.

(10) Patent No.: US 10,144,649 B2
(45) Date of Patent: Dec. 4, 2018

(54) METHOD FOR PURIFYING BORAZANE (71) Applicant: ARIANEGROUP SAS, Paris (FR)

(72) Inventors: Nicolas Vandecandelaere, Champcueil (FR); Valentin Dubois, Vert le Petit (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 15/759,925

(22) PCT Filed: Sep. 16, 2016

(86) PCT No.: PCT/FR2016/052348
§ 371 (c)(1),
(2) Date: Mar. 14, 2018

(87) PCT Pub. No.: WO2017/046539
PCT Pub. Date: Mar. 23, 2017

(65) Prior Publication Data
US 2018/0257943 A1 Sep. 13, 2018

(30) Foreign Application Priority Data
Sep. 18, 2015 (FR) .................................... 15 58802

(51) Int. Cl.
*C01B 35/14* (2006.01)
(52) U.S. Cl.
CPC ........ *C01B 35/146* (2013.01); *C01P 2002/86* (2013.01); *C01P 2002/88* (2013.01)
(58) Field of Classification Search
CPC ............... C01B 35/146; C01P 2002/86; C01P 2002/88
See application file for complete search history.

(56) References Cited

U.S. PATENT DOCUMENTS

2014/0186252 A1    7/2014 Spielvogel et al.

FOREIGN PATENT DOCUMENTS

WO    WO 2011/144878 A1    11/2011
WO    WO 2015/100157 A1    7/2015

OTHER PUBLICATIONS

International Preliminary Report on Patentability and the Written Opinion of the International Searching Authority as issued in International Patent Application No. PCT/FR2016/052348, dated Mar. 20, 2018.

(Continued)

*Primary Examiner* — Anthony J Zimmer
(74) *Attorney, Agent, or Firm* — Pillsbury Winthrop Shaw Pittman LLP (57) ABSTRACT

A method for purifying solid borazane ($NH_3BH_{3\,(s)}$) includes a) bringing solid borazane ($NH_3BH_{3\,(s)}$) containing impurities into contact with a stream of gaseous ammonia ($NH_{3\,(g)}$) to obtain, by selective liquefaction of the borazane, a liquid phase containing liquefied borazane and ammonia and a solid phase constituted of at least a part of the impurities, b) separating the liquid and solid phases for recovery of the liquid phase, on the one hand, and of the solid phase, on the other hand; c) removing the ammonia from the recovered liquid phase, this removal causing precipitation of the purified borazane ($NH_3BH_{3\,(s')}$); and d) recovering the purified precipitated borazane ($NH_3BH_{3\,(s')}$).

12 Claims, 6 Drawing Sheets (56) References Cited

OTHER PUBLICATIONS

International Search Report as issued in International Patent Application No. PCT/FR2016/052348, dated Nov. 9, 2016.
Gao, L., et al., "Liquefaction of Solid-State $BH_3NH_3$ by Gaseous $NH_3$," Inorganic Chemistry, vol. 50, No. 10, May 2011, XP055294005, pp. 4301-4306.

METHOD FOR PURIFYING BORAZANE

CROSS REFERENCE TO RELATED APPLICATIONS

This application is the U.S. National Stage of PCT/FR2016/052348 filed Sep. 16, 2016, which in turn claims priority to French Application No. 1558802, filed Sep. 18, 2015. The contents of both applications are incorporated herein by reference in their entirety.

The present invention relates to a method for purifying borazane.

Borazane or ammonia borane, of chemical formula $NH_3BH_3$, which exists in the form of a white crystalline powder, has the unique potential of containing 19.6 wt. % of hydrogen. It is thus positioned as a particularly advantageous candidate for the solid storage of hydrogen.

Borazane may be obtained according to various synthesis routes. The most common and the most developed of these synthesis routes is the metathesis of salts, borohydride salt, on the one hand (for example $NaBH_4$), and ammonium salt, on the other hand (for example $(NH_4)_2CO_3$), in an organic solvent. The synthesis route based on a displacement between a borane ($R.BH_3$) and an amine, typically ammonia, has also been widely described. In point of fact, irrespective of the exact borazane synthesis route used (starting from suitable reagents), borazane is always obtained more or less contaminated with traces of reagents (part of said reagents which have not reacted), with impurities contained in the reagents, with by-products of the synthesis reaction and/or with products of decomposition of said borazane (for example boron oxides). The melting point of borazane is affected by the presence of these impurities. The purer the borazane, the higher its melting point.

The use of borazane as a hydrogen generator (more exactly as a generator of hydrogenated gases containing a more or less substantial content of hydrogen) has been described according to several methods: by hydrolysis of said borazane, by heat treatment of said borazane (it decomposes in several steps) and by self-sustained (exothermic) combustion of said borazane, formulated with at least one inorganic oxidant.

Irrespective of the exact mode of use of borazane as hydrogen generator, it is strongly advantageous to have available a borazane of high purity, with reference to the purity of the hydrogen generated and, obviously, also to the yield of the reaction for generating said hydrogen. Moreover, the borazane purity is a factor which influences its thermal stability: in point of fact, it is known that the impurities present have a negative influence on the heat resistance of borazane; they are responsible for low temperatures of decomposition (exothermic decomposition, in the solid state) and of melting of said borazane (see above).

Various methods for purifying (solid) borazane have already been proposed.

Several of them are based on a recrystallization from solvent. Depending on the solvent selected and the solubility of borazane therein, the purification is efficient to a greater or lesser extent, consumes starting materials (borazane, solvent) to a greater or lesser extent and thus has a more or less advantageous yield. Moreover, performing such a purification may involve subjecting the product to high temperatures that are liable to have a negative impact thereon: in point of fact, borazane has relatively little stability at temperatures above 50° C.

Patent application US 2014/0186252 thus describes a method for purifying borazane which comprises:
dissolving borazane in an alkaline aqueous solution,
heating the solution obtained for the purposes of decomposing and precipitating the impurities,
removing the precipitated impurities,
cooling the aqueous solution freed of said impurities for the purposes of precipitating the purified borazane, and
recovering said precipitated purified borazane.

Patent application WO 2011/144878 moreover teaches a method for recovering borazane, contaminated with a maximum of 2 wt. % of impurities, from a tetrahydrofuran solution containing it. Said method, advantageously performed following the synthesis of said borazane by metathesis, essentially comprises a selective precipitation of borazane using a non-solvent. The precipitated borazane may still be purified by selective dissolution in an alcohol.

More exotic techniques for purifying borazane have also been described, for instance sublimation. Such techniques are generally complicated to implement because of their operating conditions (especially the pressure and/or temperature).

It was moreover described, in Inorg. Chem. 2011, 50, 4301-4306, that, at 1 to 4 bar of ammonia, borazane reversibly absorbs up to 6 equivalents of ammonia and becomes liquid at 0° C.

In such a context, a method for purifying borazane is now described, which is novel and particularly advantageous, due to its efficiency, its good yields, the fact that its starting materials are inexpensive, the fact that its operating conditions (temperature and pressure) are sparingly restrictive (less restrictive than those of the purification methods of the prior art) and the fact that it can be performed semi-continuously, or even continuously.

Said novel and particularly advantageous method for purifying borazane is based on the following phenomenon: the liquefaction of (solid) borazane in the presence of gaseous ammonia (the liquefaction of said (solid) borazane by said gaseous ammonia), especially at room temperature and atmospheric pressure. The method should more correctly be referred to as a co-liquefaction of (solid) borazane and of (gaseous) ammonia. Physicochemical interactions, similar to those which are developed during the dissolution of borazane in liquid ammonia (at a temperature of less than or equal to −33° C. or at a pressure of greater than or equal to 7-8 bar; a person skilled in the art knows the liquid-vapor diagram of ammonia), quite probably explain said co-liquefaction. This co-liquefaction is selective: it makes it possible to separate at least a part of the impurities present, which are insoluble.

The co-liquefaction (of (solid) borazane and of (gaseous) ammonia) was observed by the inventors (they especially observed that a stream of gaseous ammonia, at a very low flow rate, directed onto 2 g of borazane powder caused deliquescence of the powder and then its liquefaction (0.7 g of gaseous ammonia having been consumed); see also the example below): a liquid phase is generated; from this liquid phase, it is possible successively to recover ammonia and borazane, said borazane being recovered in an amount corresponding virtually to the starting amount (see below).

This co-liquefaction is selective insofar as a solid phase is generated in parallel with the liquid phase and insofar as the borazane recovered from said liquid phase is purer than the starting borazane (comparison of the melting points and of the $^1H$ and $^{11}B$ NMR spectra prove this assertion) (see below).

This (co-)liquefaction phenomenon and its exploitation in the context of a method for purifying borazane are thus particularly advantageous since they make it possible to dispense with all the cumbersome operating conditions for the liquefaction of ammonia.

The subject of the present invention is thus a method for purifying borazane, more precisely a method for purifying solid borazane containing impurities. Said borazane contains said impurities in a more or less substantial content. It may thus, for example, have a melting point of less than 115° C., or even less than 113° C., or even less than 110° C.

The purification method of the invention comprises bringing the solid borazane containing impurities into contact with gaseous ammonia, more precisely and characteristically with a stream of gaseous ammonia. As has been seen above, such a bringing into contact (a placing in contact) results in the liquefaction of the solid borazane (=the co-liquefaction of said solid borazane with gaseous ammonia), selective liquefaction responsible for the desired purification, liquefaction rendering unnecessary the intervention of an expensive solvent, whence (partly) the great value of the purification method of the invention.

Said purification method of the invention thus comprises bringing solid borazane ($NH_3BH_{3\ (s)}$)/stream of gaseous ammonia ($NH_{3\ (g)}$) into contact; a selective (co-)liquefaction of said solid borazane resulting from this bringing into contact.

The borazane purification method of the invention comprises:

a) bringing solid borazane ($NH_3BH_{3\ (s)}$) containing impurities into contact with a stream of gaseous ammonia ($NH_{3\ (g)}$) to obtain, by selective liquefaction of the borazane, a liquid phase (L) containing liquefied borazane and ammonia and a solid phase (S) constituted of at least a part of said impurities;

b) separating said liquid (L) and solid (S) phases for recovery of said liquid phase (L), on the one hand, and of said solid phase (S), on the other hand;

c) removing the ammonia from said recovered liquid phase (L), this removal causing precipitation of the purified borazane ($NH_3BH_{3\ (s)}$); and d) recovering said purified precipitated borazane ($NH_3BH_{3\ (s)}$).

The purification method of the invention is not based on a selective dissolution of borazane in a conventional solvent. It is based on a selective liquefaction with an inexpensive partner: gaseous ammonia ($NH_{3\ (g)}$); the feeding in said partner being performed continuously insofar as said partner participates in the form of a stream (it is understood that the sufficient amount required is made available more or less rapidly as a function of the flow rate of said stream. There is no constraint on said flow rate: it is always possible to obtain the expected liquefaction result (more or less rapidly, according to said faster or slower flow rate)).

Said purification method is generally performed at atmospheric pressure and at room temperature (i.e. at a temperature (T) of between 18° C. and 25° C.:18° C.≤T≤25° C.); said purification method is thus generally performed with the use of gaseous ammonia at atmospheric pressure and at room temperature (i.e. at a temperature (T) of between 18° C. and 25° C.; 18° C.≤T≤25° C.). It cannot be totally excluded from the scope of the invention to perform the method at a pressure other than atmospheric pressure and/or at a temperature other than room temperature, the participating ammonia obviously always being gaseous. However, a priori, this presents hardly any interest. In contrast, the interest of the method of the invention lies to a large extent in its possible (and thus particularly advantageous) implementation at atmospheric pressure and at room temperature.

A person skilled in the art has already understood the great value of the purification method of the invention. Said method makes only use of an inexpensive product (gaseous ammonia, liquefaction partner) and ensures the expected result (of separation of at least a part of the impurities) under mild temperature and pressure operating conditions, which are advantageous both with respect to the implementation of said method and with respect to the stability of the borazane to be purified and of the purified borazane. Said method is also particularly advantageous in the sense that it can be performed semi-continuously (steps a and b, in a first stage, and then, separately, steps c and d, in a second stage), or even continuously (steps a to d, continuously). It is very advantageously performed continuously.

The solid borazane to be purified according to the method of the invention (thus to be brought into contact with a stream of gaseous ammonia for its liquefaction) may be in dispersed form, especially in the form of a powder or in the form of granules. It may also be in an undispersed form, a monolithic form. The formation of a liquid phase was observed irrespective of the exact form of the solid borazane brought into contact with gaseous ammonia.

The gaseous ammonia is advantageously used in a mole ratio R=gaseous ammonia/solid borazane (R=$NH_{3\ (g)}$/$NH_3BH_{3\ (s)}$) of greater than 1. The use of excess ammonia is strongly recommended. The gaseous ammonia is in fact very advantageously used in such a mole ratio (R) of between 5 and 15 (5≤R≤15).

To ensure the bringing into contact of the solid borazane and of the stream of gaseous ammonia ($NH_3BH_{3\ (s)}$), a flushing of the atmosphere above said solid borazane (in dispersed or undispersed form) or a passage of the stream as close as possible to said solid borazane (in dispersed or undispersed form), or even through said solid borazane (in dispersed form) may be performed.

The inventors thus observed the selective liquefaction of borazane, i.e. the appearance of a dispersion whose liquid phase contains borazane (co-liquefied with ammonia) and whose dispersed, solid phase consists of impurities.

The liquid phase/solid phase separation may be performed via any type of conventional liquid/solid separation method, especially by filtration or centrifugation. It is advantageously performed by filtration.

For the recovery of the purified borazane (purified via the removal of the solid phase) from the liquefied borazane, the ammonia should be removed from the liquid phase. Said ammonia is conveniently removed by evaporation, with or without placing under vacuum.

The removal of the ammonia (in fact, 1) first removal of that present in the gaseous headspace and 2) removal of that present in the liquid phase (which transits via the gaseous headspace)) brings about a return to the solid state of the borazane. The precipitated borazane (in dispersed form) corresponds to the starting borazane freed of the impurities which were not dissolved in the liquid phase (resulting from the co-liquefaction of borazane and ammonia), during the step of bringing the solid borazane into contact with the stream of gaseous ammonia.

It is proposed to specify below, in an entirely non limiting manner, two implementation variants of the method of the invention.

According to a first variant, it is on conclusion of the bringing of the solid borazane into contact with the stream of gaseous ammonia (step a of the purification method of the invention), thus after liquefaction of said solid borazane (=the solid borazane/gaseous ammonia co-liquefaction) and stoppage of said stream, that the separation of the liquid and solid phases (step b of the purification method of the invention) is performed.

Figure 2A:
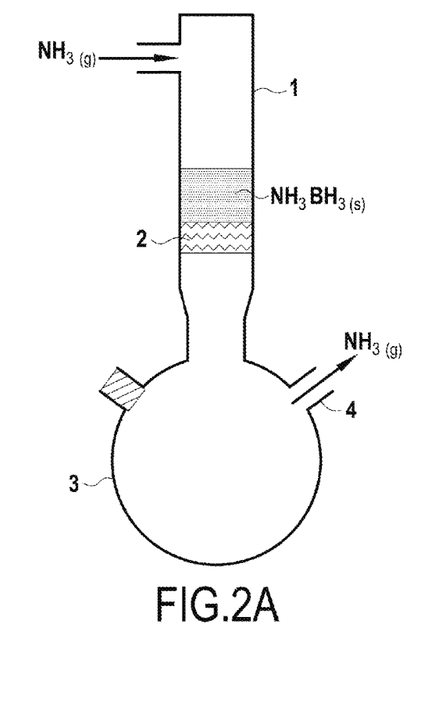
FIGS. 2A-2C illustrate a second implementation variant of the borazane purification method according to the invention (=the second variant specified above), more specifically a second implementation variant according to which the separation of the liquid and solid phases is performed during the bringing of the solid borazane into contact with a stream of gaseous ammonia (FIG. 2B)
Figure 2B:
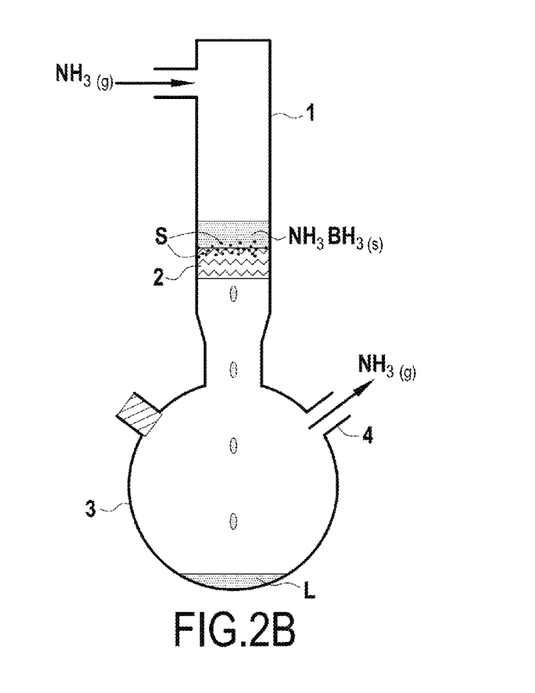
Figure 2C:
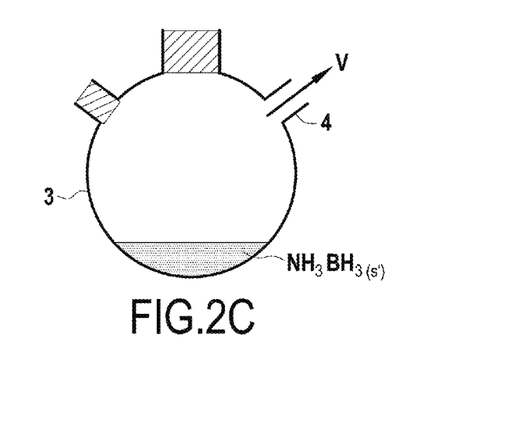

According to a second variant, the separation of the liquid and solid phases (step b of the purification method of the invention) is performed during the bringing of the solid borazane into contact with the stream of gaseous ammonia (step a of the purification method of the invention; said steps a and b then being performed virtually simultaneously); said separation of said liquid and solid phases is thus performed gradually as the selective liquefaction proceeds. For the implementation of this second variant, the method may especially be performed as follows. The solid borazane is placed on a filter. It is brought into contact with a stream of ammonia gas; said stream of ammonia gas advantageously passes through said filter. The liquid phase generated is recovered below said filter, whereas the solid phase is retained by said filter. If the borazane is present in dispersed form, it is appreciated that the liquid phase generated can progress by sedimentation through said dispersed form and that it then passes through the filter. If the borazane is present in monolithic form, it is appreciated that it does not occupy all the area of the filter, and as such the liquid phase generated has access to said filter.

It is proposed below to specify one and the other of said implementation variants of the method of the invention with reference to the attached FIGS. 1A to 2C).

FIGS. 1A, 1B, 1C and 1D illustrate a first implementation variant of the borazane purification method according to the invention (=the first variant specified above), more specifically a first implementation variant according to which it is on conclusion of the bringing of the solid borazane into contact with a stream of gaseous ammonia (FIG. 1B) that the separation of the liquid and solid phases takes place.

FIGS. 2A, 2B and 2C illustrate a second implementation variant of the borazane purification method according to the invention (=the second variant specified above), more specifically a second implementation variant according to which the separation of the liquid and solid phases is performed during the bringing of the solid borazane into contact with a stream of gaseous ammonia (FIG. 2B).

Figure 3A:
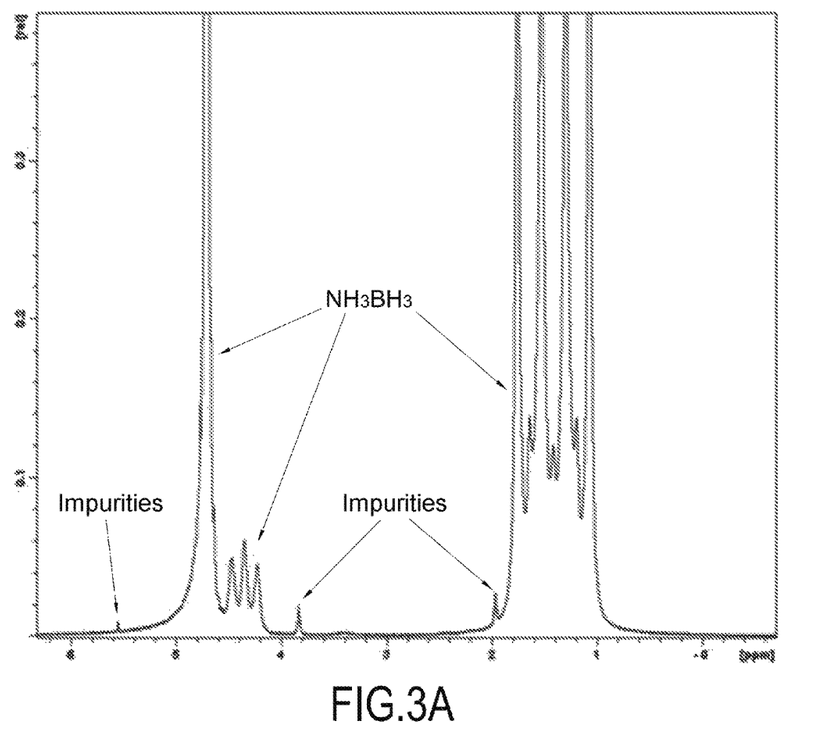
FIGS. 3A-3B show, respectively, the $^1$H NMR spectra (solvent: $D_2O$) of borazane before (FIG. 3A) and after (FIG. 3B) purification according to the example of the invention.
Figure 3B:
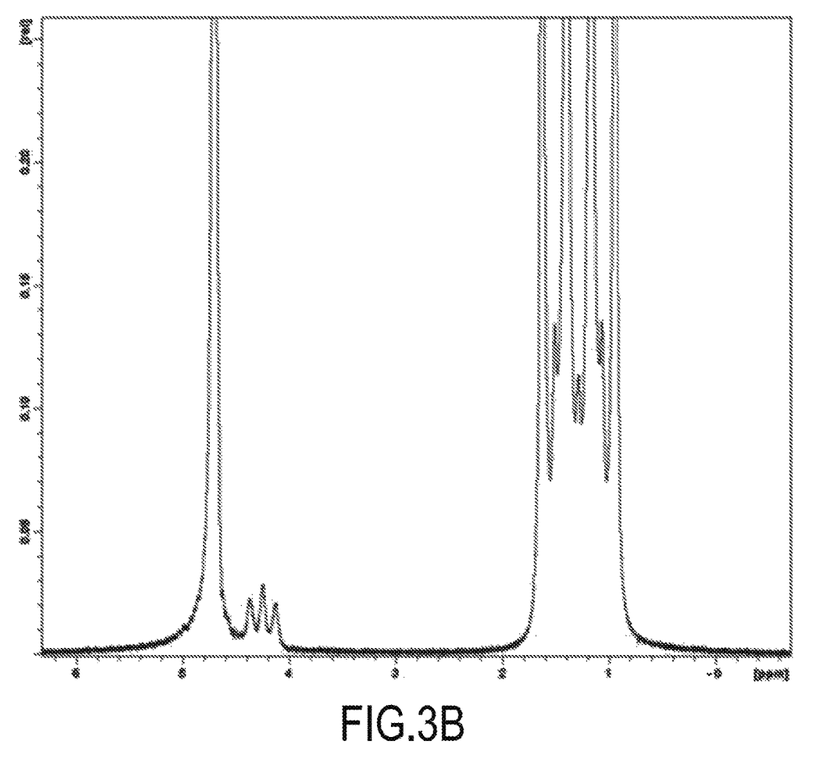
Figure 4A:
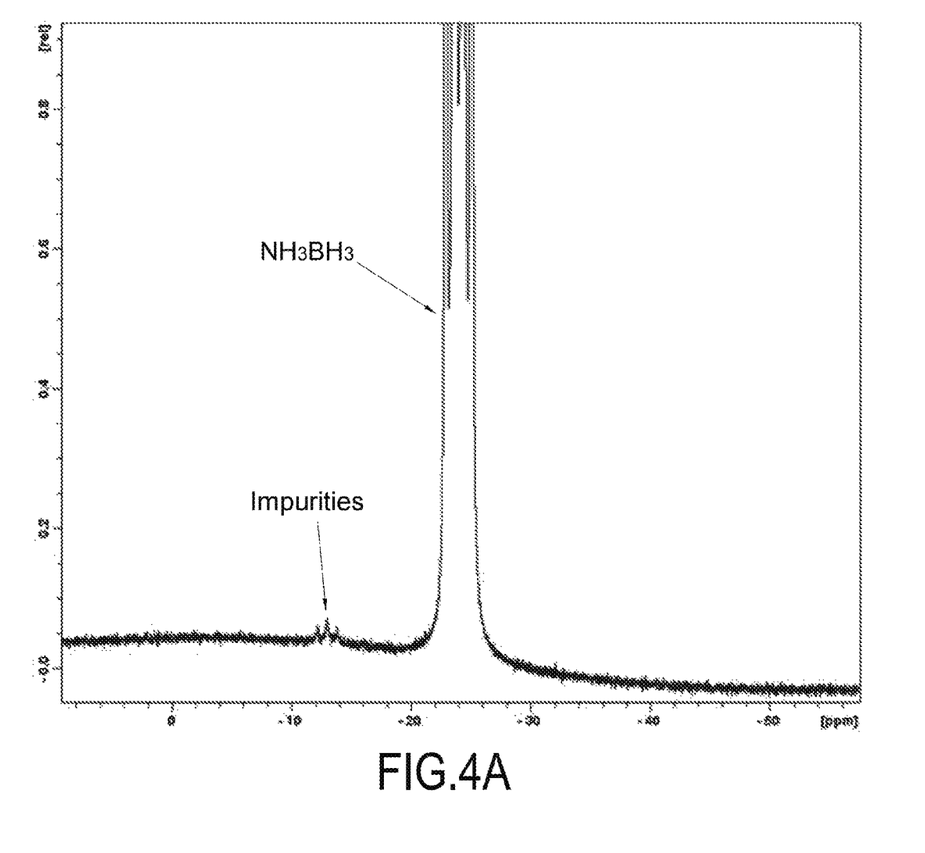
FIGS. 4A-4B show, respectively, the $^{11}$B NMR spectra (solvent: $D_2O$) of borazane before (FIG. 4A) and after (FIG. 4B) purification according to the example of the invention.
Figure 4B:
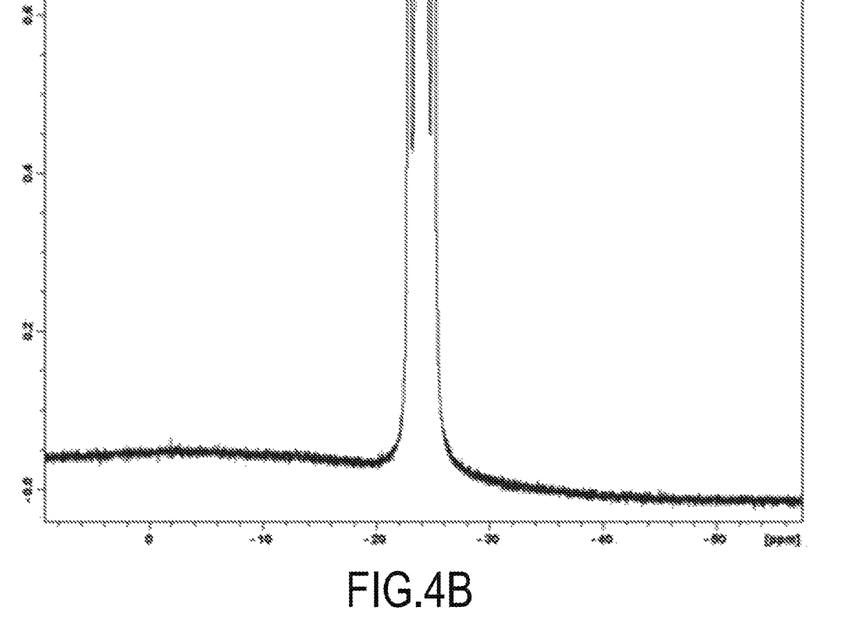

FIGS. 3A and 3B show, respectively, the $^1$H NMR spectra (solvent: $D_2O$) of borazane before (FIG. 3A) and after (FIG. 3B) purification according to the example of the invention (see below);

FIGS. 4A and 4B show, respectively, the $^{11}$B NMR spectra (solvent: $D_2O$) of borazane before (FIG. 4A) and after (FIG. 4B) purification according to the example of the invention (see below).

Figures 1A, 1C:
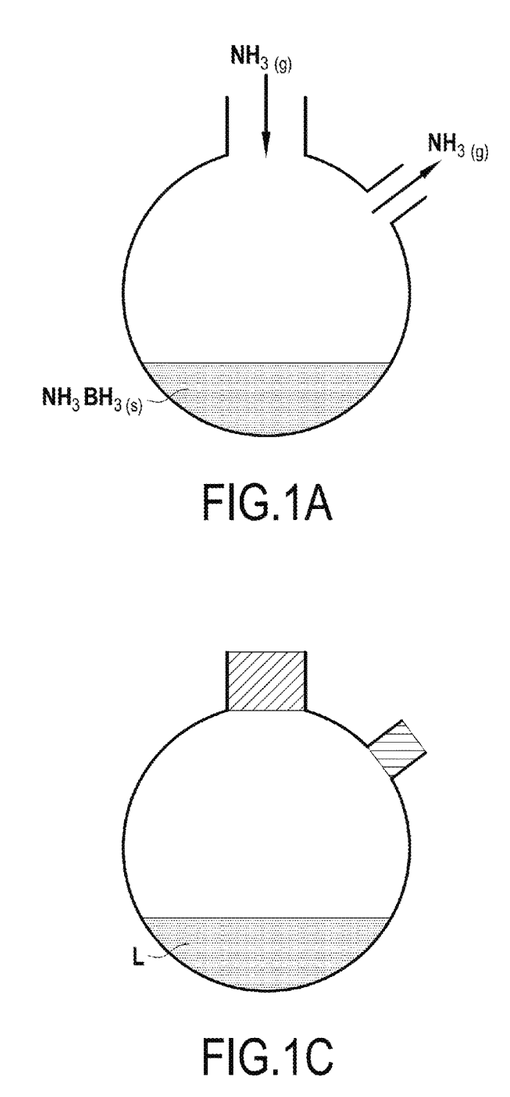
FIGS. 1A-1D illustrate a first implementation variant of the borazane purification method according to the invention (=the first variant specified above), more specifically a first implementation variant according to which it is on conclusion of the bringing of the solid borazane into contact with a stream of gaseous ammonia (FIG. 1B) that the separation of the liquid and solid phases takes place.

FIG. 1A thus schematically represents a bringing into contact of solid borazane ($NH_3BH_{3\ (s)}$)/stream of gaseous ammonia ($NH_{3\ (g)}$). The solid borazane is dispersed at the bottom of a round-bottomed flask. A stream of gaseous ammonia ($NH_{3\ (g)}$) passes through said flask.

Figure 1B:
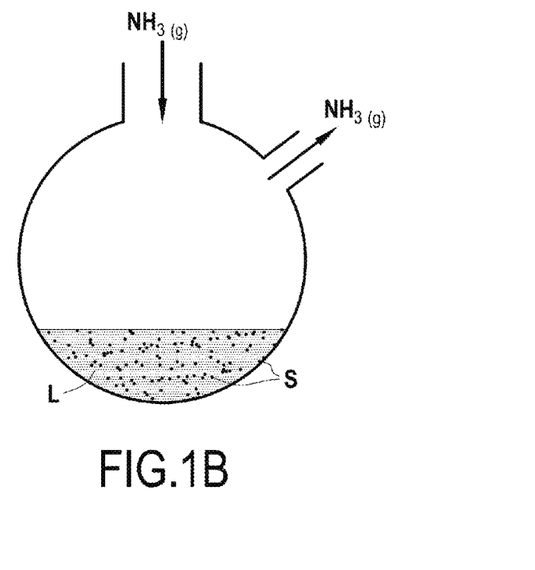

FIG. 1B schematically represents the result obtained: the solid borazane has been liquefied. Solid impurities S are present within the liquid phase L obtained.

After stopping the stream of ammonia, there is no difficulty in separating the liquid L and solid S phases. The liquid phase L is obtained freed of the solid impurities S (FIG. 1C).

Figure 1D:
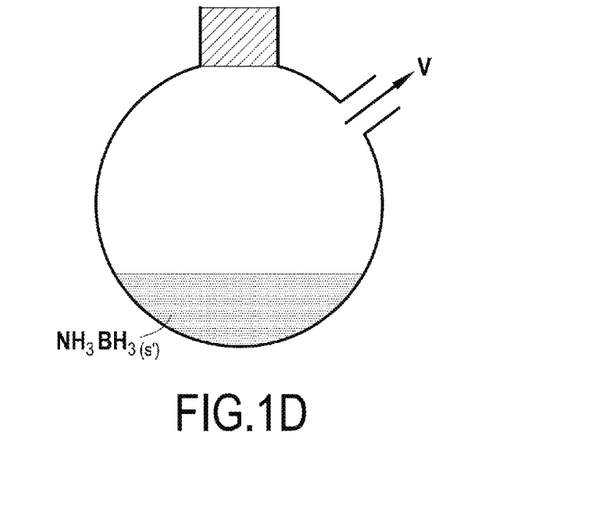

FIG. 1D shows the removal of ammonia (by placing the flask containing the liquid phase L under vacuum; said placing under vacuum is represented schematically by the arrow V). Said FIG. 1D in fact shows the content of the flask at the end of said placing under vacuum V, i.e. the purified borazane obtained, referenced $NH_3BH_{3\ (s')}$.

FIG. 2A shows:

at 1, a Schlenk tube,
at 2, a filter,
at 3, a three-necked round-bottomed flask, and
at 4, a neck of said three-necked round-bottomed flask.

The arrows symbolize the stream of gaseous ammonia ($NH_{3\ (g)}$) placed in circulation.

The solid borazane ($NH_3BH_{3\ (s)}$) to be purified is placed on said filter 2.

On contact with the stream of gaseous ammonia ($NH_{3\ (g)}$), said solid borazane ($NH_3BH_{3\ (s)}$) becomes liquefied; once liquefied (co-liquefied with gaseous ammonia), it passes through said filter 2 and becomes accumulated at the bottom of the flask 3. The solid phase S is stopped by said filter 2. This (steps a) and b) of the method of the invention) is represented schematically in FIG. 2B.

When all the solid borazane has been liquefied, the stream of gaseous ammonia is stopped. Removal of the ammonia by placing the volume of the flask 3 under vacuum is then performed. This placing under vacuum is represented schematically, in FIG. 2C, by the arrow V. FIG. 2C in fact shows the contents of the flask 3 at the end of said placing under vacuum V. The solid borazane ($NH_3BH_{3\ (s)}$) initially placed on the filter 2 is obtained freed of the solid phase S, i.e. purified. It has been referenced $NH_3BH_{3\ (s')}$.

The method of the invention, more specifically its second variant, as specified above, is illustrated by the example below.

EXAMPLE

A device, as represented schematically in FIGS. 2A and 2B, comprising a Schlenk tube (4 cm in diameter) equipped with a filter and connected to a three-necked round-bottomed flask was used.

Ammonia borane (or borazane) in powder form (about 4 g) was placed on the filter and a stream of gaseous ammonia (about 45 mL/min) was passed through the bed of powder and said filter (in the direction: upstream to downstream of the filter), at room temperature (20° C.) and at atmospheric pressure. Under these conditions, the ammonia borane was (co-)liquefied and, by sedimentation, the liquid phase generated passed through the filter. The insoluble impurities in said liquid phase remained on the filter.

After 2 hours of filtration under ammonia, the filtered liquid phase was recovered and dried in ambient air (natural evaporation of the ammonia) to obtain the purified ammonia borane in solid form (FIG. 2C). 3.89 g of purified ammonia borane were thus recovered.

The efficiency of the purification was evaluated by analyzing the melting point of the ammonia borane by DSC (Differential Scanning calorimetry) analysis, performed with a temperature increase ramp of 5° C./min. Before purification according to the invention, the melting point of the product was 112.8° C.; after purification according to the invention, it was 115.9° C. This increase in melting point reflects an improvement in the purity of the product.

Comparative examination of the $^1$H NMR and $^{11}$B NMR spectra of the borazane used in said example, before and after purification according to the invention, is moreover proposed (see, respectively, FIGS. 3A and 3B and FIGS. 4A and 4B). It is clearly shown that peaks, undoubtedly corresponding to impurities (see the relative amounts relative to the peaks corresponding to the hydrogen atoms or to the boron atoms of borazane), present in the spectra of the borazane to be purified, are no longer present in the spectra of the purified borazane.

The invention claimed is:

1. A method for purifying solid borazane ($NH_3BH_{3\ (s)}$) containing impurities, said method comprising:
    a) bringing solid borazane ($NH_3BH_{3\ (s)}$) containing impurities into contact with a stream of gaseous ammonia ($NH_{3\ (g)}$) to obtain, by selective liquefaction of the borazane, a liquid phase containing liquefied borazane and ammonia and a solid phase constituted of at least a part of said impurities;
    b) separating said liquid and solid phases for recovery of said liquid phase, on the one hand, and of said solid phase, on the other hand;
    c) removing the ammonia from said recovered liquid phase, the removal causing precipitation of the purified borazane ($NH_3BH_{3\ (s')}$); and
    d) recovering said purified precipitated borazane ($NH_3BH_{3\ (s')}$).

2. The method as claimed in claim 1, wherein it is performed at atmospheric pressure and at room temperature.

3. The method as claimed in claim 1, wherein it is performed continuously.

4. The method as claimed in claim 1, wherein said solid borazane ($NH_3BH_{3\ (s)}$) is in dispersed form or in undispersed form.

5. The method as claimed in claim 1, wherein the gaseous ammonia ($NH_{3\ (g)}$) is used in a gaseous ammonia/solid borazane mole ratio ($R=NH_{3\ (g)}/NH_3BH_{3\ (s)}$) of greater than 1.

6. The method as claimed in claim 1, wherein the separation of the liquid and solid phases is performed by filtration or by centrifugation.

7. The method as claimed in claim 1, wherein the ammonia is removed from said recovered liquid phase by evaporation.

8. The method as claimed in claim 1, wherein said separation is performed on conclusion of said bringing into contact, after stopping said stream.

9. The method as claimed in claim 1, wherein said separation is performed during said bringing into contact.

10. The method as claimed in claim 9, wherein said solid borazane ($NH_3BH_{3\ (s)}$), placed on a filter, is brought into contact with a stream of ammonia gas ($NH_{3\ (g)}$) and wherein the liquid phase generated is recovered below said filter whereas the solid phase is retained by said filter.

11. The method as claimed in claim 1, wherein the gaseous ammonia ($NH_{3\ (g)}$) is used in a gaseous ammonia/solid borazane ($R=NH_{3\ (g)}/NH_3BH_{3\ (s)}$) mole ratio between 5 and 15.

12. The method as claimed in claim 6, wherein the separation of the liquid and solid phases is performed by filtration.

* * * * *